(12) United States Patent
Hensley

(10) Patent No.: US 7,017,039 B2
(45) Date of Patent: Mar. 21, 2006

(54) METHOD OF BOOTING A COMPUTER OPERATING SYSTEM TO RUN FROM A NORMALLY UNSUPPORTED SYSTEM DEVICE

(76) Inventor: John Alan Hensley, 12421 Hardee Rd., Raleigh, NC (US) 27614-9234

( * ) Notice: Subject to any disclaimer, the term of this patent is extended or adjusted under 35 U.S.C. 154(b) by 158 days.

(21) Appl. No.: 10/334,611

(22) Filed: Dec. 31, 2002

(65) Prior Publication Data

US 2004/0128495 A1 Jul. 1, 2004

(51) Int. Cl.
*G06F 9/24* (2006.01)

(52) U.S. Cl. .................. 713/2; 713/1; 713/160
(58) Field of Classification Search .................. 713/1, 713/2, 100; 714/2, 6, 36, 160
See application file for complete search history.

(56) References Cited

U.S. PATENT DOCUMENTS

| | | | |
|---|---|---|---|
| 5,546,585 A * | 8/1996 | Soga ........................ | 713/2 |
| 5,627,964 A | 5/1997 | Reynolds et al. | |
| 6,035,395 A * | 3/2000 | Saito ........................ | 713/1 |
| 6,173,417 B1 | 1/2001 | Merrill | |
| 6,263,378 B1 | 7/2001 | Rudoff et al. | |
| 6,279,109 B1 | 8/2001 | Brundridge | |
| 6,317,845 B1 | 11/2001 | Meyer et al. | |
| 6,334,149 B1 | 12/2001 | Davis, Jr. et al. | |
| 6,370,641 B1 | 4/2002 | Maia | |
| 6,401,140 B1 | 6/2002 | Wu | |
| 6,615,365 B1 * | 9/2003 | Jenevein et al. ............. | 714/6 |
| 2003/0074550 A1 * | 4/2003 | Wilks et al. ................. | 713/2 |

* cited by examiner

*Primary Examiner*—Lynne H. Browne
*Assistant Examiner*—Paul Yanchus
(74) *Attorney, Agent, or Firm*—Coats & Bennett, P.L.L.C.

(57) ABSTRACT

A computer operating system (OS) is altered to boot so as to run from a normally unsupported system device (NUSD). The OS kernel is loaded from a natively supported boot device, such as a floppy disk or CD-ROM, and initialized. Device drivers for a NUSD are then loaded from the boot device and initialized. A bootswap device driver is also loaded and initialized. The bootswap device driver is operative to alter an OS data structure such that the NUSD is recognized as a system device. Upon completion of the boot sequence, the OS runs from the NUSD as a system drive. A method of preparing the boot media and configuring the NUSD is presented.

23 Claims, 3 Drawing Sheets

METHOD OF BOOTING A COMPUTER OPERATING SYSTEM TO RUN FROM A NORMALLY UNSUPPORTED SYSTEM DEVICE

BACKGROUND OF THE INVENTION

The present invention relates generally to the field of computers, and specifically to a method of booting a computer to run from a device not normally supported by the operating system as a system device.

Modern personal computers have become complex, and may include a wide variety of peripheral devices and network interfaces. These devices may connect to the computer via a variety of standard interfaces, including the RS-232 Serial Port, Universal Serial Bus (USB), IEEE 1394 (also known as FireWire or i.Link), SCSI (Small Computer System Interface), PCMCIA (Personal Computer Memory Card International Association), and various network interfaces such as Token Ring, Ethernet, Bluetooth, IEEE 802.11, or the like. Most of these interfaces require a fully configured and running operating system to provide access to the attached device(s) and/or network(s). That is, they are not recognized by the computer ROMBIOS as boot devices, and additionally are not natively supported as boot or system devices by the operating system. As such, data storage devices attached to the computer via these interfaces are a poor choice for use as backup devices for critical system files needed in the event of a computer crash, such as may be caused by a hard drive malfunction, virus infection or other problem that keeps the computer operating system (OS) from successfully running and providing access the to backup device.

The Microsoft Windows NT/2000/XP operating systems are documented as being able to use any hard drive as the boot or system drive; as long as the boot drive and system drives are accessible using one of two supported scenarios. In the first scenario all of the operating system files are placed on one or two hard drives that are accessible in real-mode using the computer's ROMBIOS interface. In this scenario the boot and system drives are either the same drive or two individual drives that are both accessible using the real-mode ROMBIOS interface. In the second scenario there is a boot drive that is accessible using the real-mode ROMBIOS interface and a system drive that is accessible using a SCSI miniport driver that has been placed in the root directory of the boot drive. These two scenarios restrict the system drive to a standard IDE or SCSI hard drive that is supported by the real-mode ROMBIOS or by a standard SCSI miniport driver, respectively. This restriction excludes using as a system drive many other storage devices that interface to the computer via USB, IEEE 1394, PCMCIA or other interfaces, as well as any other devices that are not natively supported as a system device by the operating system or ROMBIOS.

Manufacturers of detachable external computer storage devices based on such external interfaces must provide end users with disaster recovery software that will allow restoring an archived copy of the normal computer hard drive (i.e., a "back-up") back to the hard drive in cases where the computer will not boot normally. Without this functionality, the usefulness of the external computer storage device would be very limited. Ideally the disaster recovery software provided by the device manufacturer would also allow the end user to first locate and recover any files existing on the primary computer hard drive that may have been created or updated at a time later than those stored on the external storage device.

Current disaster recovery methods that deal with restoring unbootable computer systems running a modern operating system—such as Windows NT, 2000, or XP—either require a re-installation of the original operating system on the normal computer system hard drive, or else providing a secondary, legacy-based operating system, such as a prior version of Windows, containing hardware specific device drivers, to provide access to the external storage device.

Re-installing the operating system is a daunting task for most users, and will often result in the loss of at least the data generated and stored on the system disk since the last back-up. Users will additionally need to locate and install device drivers and configuration software for any hardware added to the computer by the end-user.

Using a legacy-based operating system—such as MS-DOS and those versions of Microsoft Windows that were derived from MS-DOS, such as Windows 3x/9x/ME—is well known in the art. However, the use of legacy-based operating systems for disaster recovery presents several disadvantages. Use of the legacy operating system requires a separate license, thus increasing the price of the disaster recovery software. Many different hardware-specific, real-mode device drivers must be obtained and maintained to support the many different hardware interface chipsets, and there is no guarantee that legacy-based drivers will even be available as many external interface hardware manufacturers are no longer providing legacy drivers for their newer chipsets. Disaster recovery software requires a duplicate software development effort, to provide end users with maintenance tools that run under both the modern operating system such as Windows NT/2K/XP, as well as under the legacy operating system. Additionally, when running under a legacy-based operating system there is no native support for modern file systems, such as NTFS file system introduced with the Windows NT operating system in the early 1990s. Thus, it is difficult and sometimes impossible to access existing information on an NTFS partition during disaster recovery operations.

In all prior art, legacy operating system based disaster recovery systems, if the system drive becomes unusable, the computer is booted from a floppy drive or a CD-ROM that conforms to the "El Torito" format. The El Torito specification, published by Phoenix Technologies of Irvine Calif. and IBM of BocaRaton Fla., available at http://www.phoenix.com/resources/specs-cdrom.pdf and incorporated herein by reference, allows for one or more bootable hard or floppy disk "image" files on a CD-ROM, and concomitant alterations to the computer's ROMBIOS to support the CD-ROM as a bootable device.

Following an initial real-mode boot sequence from the floppy or El Torito CD-ROM, the legacy-based systems load hardware-specific real-mode drivers, and then switch to an external drive or RAM drive by substituting one of the standard operating system drive designators (such as C: or D:) for the drive designator associated with the external or RAM drive. This allows the operating system to continue to boot and run from the external or RAM drive. This system drive substitution occurs during the bootstrap phase of OS initialization, before the OS kernel and loadable device drivers (such as for example, a protected-mode OS kernel and protected-mode device drivers) have been loaded into memory and initialized. Hence the absolute necessity of the hardware-specific, real-mode device drivers to provide real-mode access to the desired drive during the bootstrap phase of OS initialization—drivers which, as previously discussed, may be difficult or impossible to obtain for all hardware devices.

In addition the deficiencies previously noted with such legacy systems, the prior art method of system drive selection during bootstrap phase (such as through drive designator redirection) will not work at all with modern operating systems such as Windows NT/2K/XP, that do not provide a reconfigurable real-mode bootstrap phase or support the use of real-mode legacy device drivers. Thus, an upgrade to the computer operating system could render its disaster recovery solution useless.

SUMMARY OF THE INVENTION

The present invention relates to a method of booting a computer operating system to run from a disk drive device that is not normally supported as a system device. An operating system kernel is loaded from a natively supported boot device and initialized. A device driver for a normally unsupported system device (NUSD) is loaded from the boot device and initialized. A bootswap device driver is also loaded and initialized. The bootswap device driver is operative to alter an operating system data structure such that the NUSD is recognized as a system device. The operating system then completes booting and runs from the NUSD as a system drive. The operating system files on the boot device and the NUSD are backup copies of the computer's primary operating system, and do not require a separate license.

DETAILED DESCRIPTION OF THE INVENTION

The present invention relates to a method of booting a modern computer operating system (OS), such as Windows NT/2K/XP, to run from a drive or other computer device not natively supported by the computer ROMBIOS as a boot device. Such a device is referred to herein as a Normally Unsupported System Device (NUSD), a term meant to be construed broadly. While the present invention is discussed herein in the context of disaster recovery applications, the invention is not so limited. The ability of a modern operating system to boot to run from a NUSD following the loading and running of a kernel and loadable device drivers is an important and novel advance in the state of the art, which may prove very useful to future operating system designs.

Figure 1:
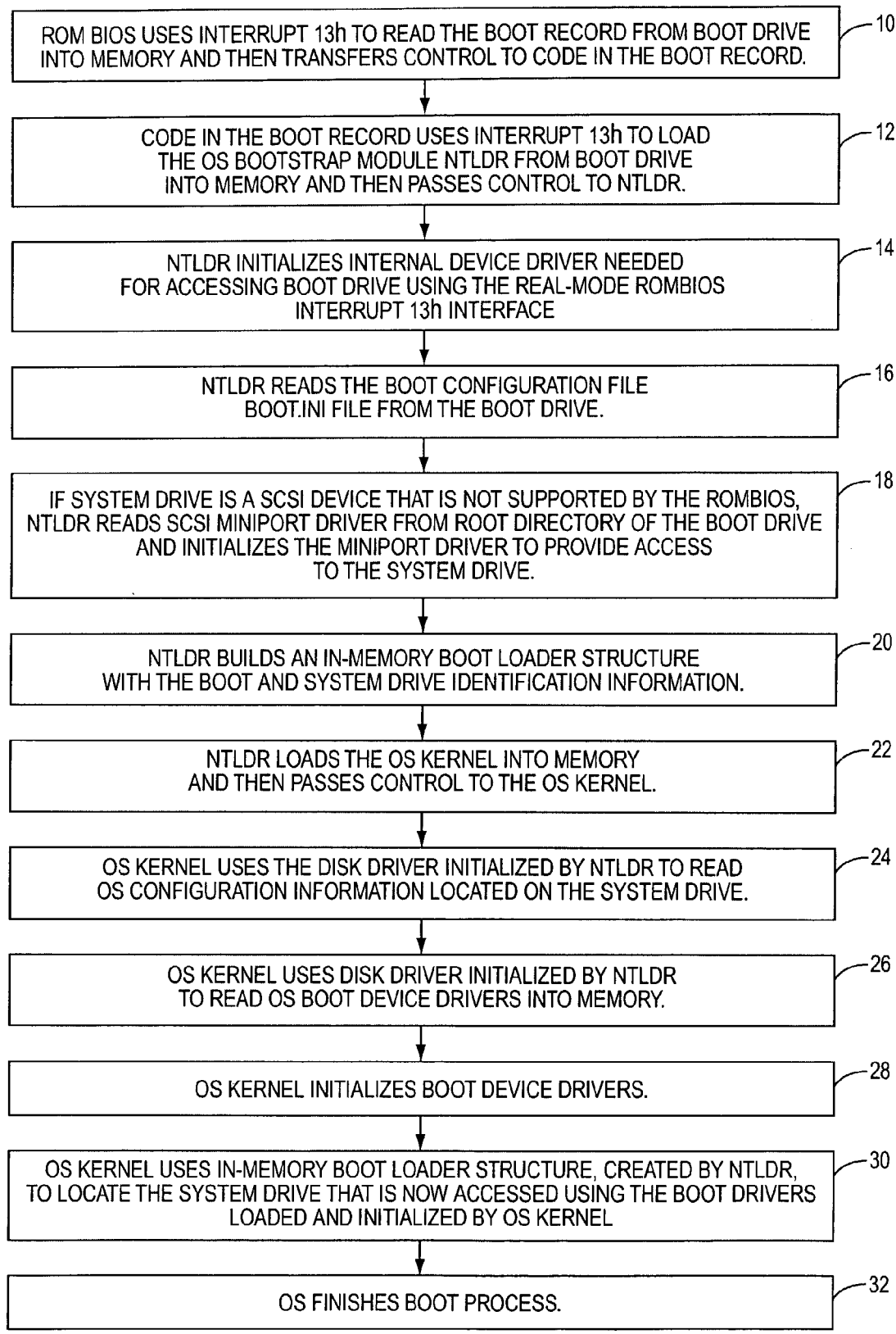
FIG. 1 is a flow diagram depicting the prior art boot process of modern operating systems.

FIG. 1 is a flow chart representation of the bootstrap process of a modern computer operating system such as Windows NT/2K/XP. As is well known in the art, the bootstrap process begins when a computer is first powered on, or when the OS is reset by a software application, by user a user keyboard command (CTRL-ALT-DLT), by a reset switch, or the like. The OS boot process begins when the POST (Power On Self Test) routine in the ROMBIOS reads a boot sector containing bootstrap code into memory via the interrupt 0x13 hard drive interface, and then transfers control of the CPU to the bootstrap code (step 10). Bootstrap code in the boot record will then use the interrupt 0x13 hard drive interface to load the OS bootstrap module, NTLDR, into memory and then pass CPU control to NTLDR (step 12).

NTLDR initializes an internal bootstrap disk device driver that uses the ROMBIOS interrupt 0x13 interface to access the boot drive (step 14). NTLDR reads the boot configuration file, BOOT.INI, from the root directory of the boot drive and parses this file to determine the boot options and the location of the system drive (step 16). If the system drive is determined in step 16 to be a SCSI device that is not supported by the ROMBIOS, NTLDR will load a SCSI miniport driver from the root directory of the boot drive and initialize the miniport driver to allow bootstrap access to the system drive (step 18). NTLDR will examine the boot and system drive and then generate an in-memory data structure containing identification information that can be used later to identify the boot and system drives, after the bootstrap drivers are no longer usable (step 20). NTLDR locates the OS kernel file on the system drive and loads this executable file into memory, and then passes CPU control to the OS kernel (step 22).

The OS kernel uses the bootstrap disk drivers to locate and load into memory the OS boot configuration files (step 24). The OS kernel uses the configuration files loaded in step 24 to determine the names of the device drivers normally used to access boot devices, such as the hard disk, when the OS is operating normally and the bootstrap drivers are no longer available. The OS then loads all of these device drivers into memory (step 26). The OS kernel then initializes the boot device drivers that were loaded into memory (step 28). At this time, the bootstrap drivers are no longer useable for accessing the boot and system drives. The OS kernel uses the in-memory structure created by NTLDR in step 20 to locate the boot and system drives which will now be accessed using one or more of the boot device drivers initialized in step 28 (step 30). The OS completes any remaining operations need to bring the system into a useable state (step 32), and is ready for use.

According to the present invention, the above-described boot process is altered, to allow the OS to recognize a NUSD as system device by the OS kernel, after the bootstrap code has completed, and to transfer further OS operation to the NUSD. A new bootswap device driver, for example named BOOTSWAP.SYS, is operative to alter the in-memory data structure created by NTLDR (see FIG. 1, step 20). BOOTSWAP.SYS updates the in-memory data structure to include information identifying the NUSD as a system drive. The OS kernel then accesses the in-memory data structure (see FIG. 1, step 30), locates the NUSD as a system drive, completes the boot process, and continues to run from the NUSD. This process is depicted in flow diagram form in FIG. 2, and a method of preparing the boot media and NUSD configuration to carry out the process is depicted in flow diagram form in FIG. 3.

Figure 2:
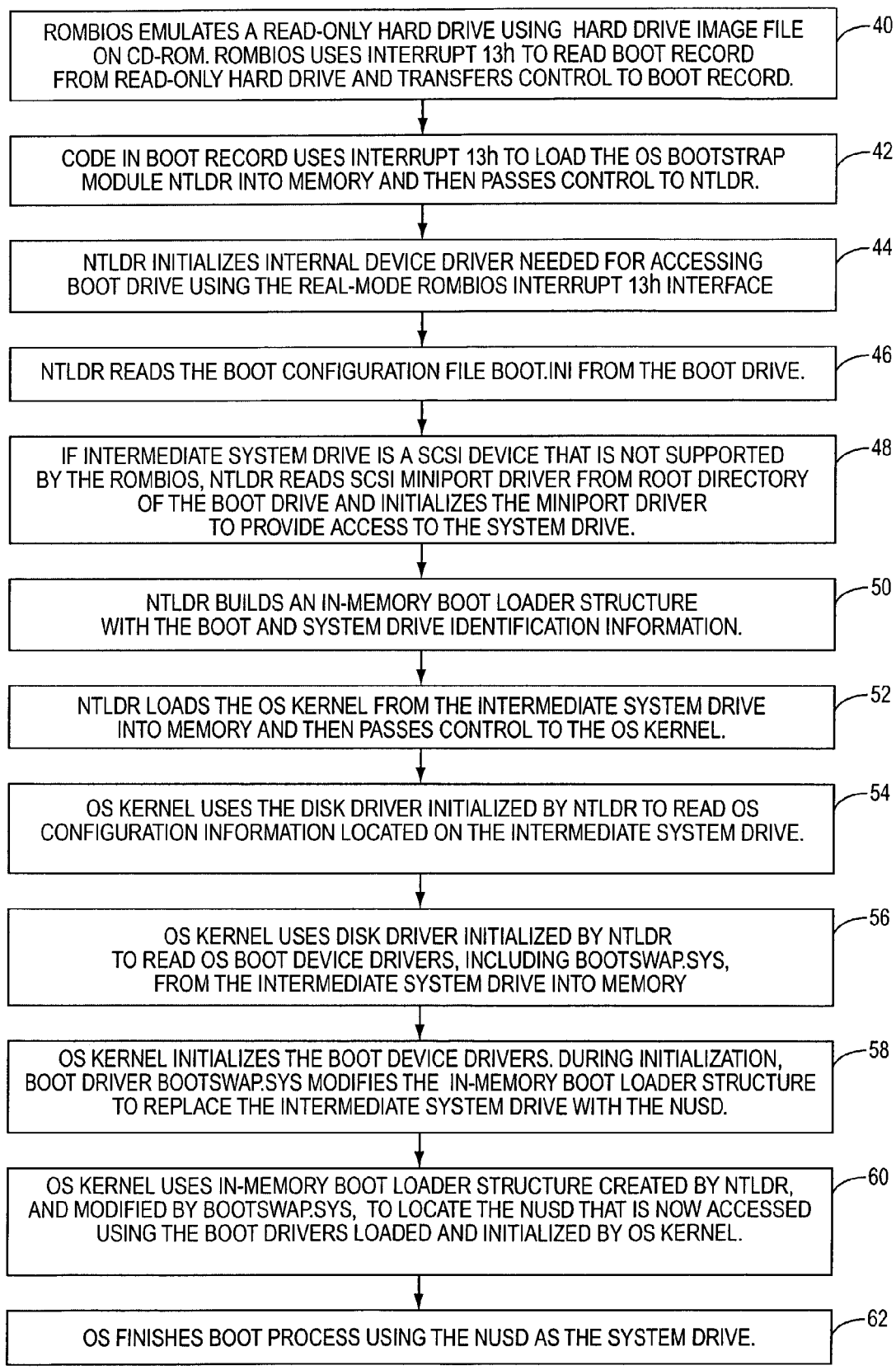
FIG. 2 is a flow diagram depicting a modified boot process according to the present invention.

FIG. 2 depicts the bootstrap operation of a computer having a device that is not normally supported as a boot drive by the computer ROMBIOS, according to the present invention. The computer is initially booted from a supported boot device, such as a floppy disk or El Torito CD-ROM. The OS then recognizes the normally unsupported system device (NUSD), completes booting, and runs from the NUSD.

The OS boot process begins when the POST routine in the ROMBIOS reads a boot sector containing bootstrap code into memory and then transfers control of the CPU to the bootstrap code (step 40). If the ROMBIOS supports the El Torito specification, it will identify the hard drive image file located on the CD-ROM device and emulate a read-only hard drive using the hard drive image file. The ROMBIOS provides access to the emulated read-only hard drive through the ROMBIOS interrupt 0x13 hard drive interface.

Bootstrap code in the boot record will then use the interrupt 0x13 hard drive interface to load the OS bootstrap module, NTLDR, into memory and then pass CPU control to NTLDR (step 42). NTLDR initializes an internal bootstrap disk device driver that uses the ROMBIOS interrupt 0x13 interface to access the boot drive (step 44). NTLDR reads the boot configuration file, BOOT.INI, from the root directory of the boot drive and parses this file to determine the boot options and the location of an intermediate system drive (step 46).

If the intermediate system drive is determined to be a SCSI device that is not supported by the ROMBIOS, NTLDR will load a SCSI miniport driver from the root directory of the boot drive and initialize the miniport driver to allow bootstrap access to the system drive (step 48). This step is not necessary in the exemplary embodiment described herein, but is included for completeness, and to demonstrate that such an option would be within the scope of the present invention.

NTLDR will examine the boot and intermediate system drive and then generate an in-memory data structure containing identification information that can be used later to identify the boot and system drives after the bootstrap drivers are no longer usable (step 50). NTLDR locates the OS kernel file on the intermediate system drive and loads this executable file into memory, and passes CPU control to the OS kernel (step 52).

The OS kernel (e.g., a protected-mode kernel) uses the bootstrap disk drivers to locate and load into memory the OS boot configuration files (step 54), which have been modified to include identification information for the NUSD. The OS kernel uses the configuration files to determine the names of the loadable boot device drivers, and then loads all of the boot device drivers, including BOOTSWAP.SYS and any NUSD device drivers previously marked as boot drivers, into memory (step 56). The OS kernel then initializes the boot device drivers (e.g., protected-mode device drivers that rely on services provided by the OS kernel) (step 58) and at this time the bootstrap drivers are no longer useable for accessing the boot and intermediate system drives.

When BOOTSWAP.SYS is initialized, it modifies the in-memory boot loader structure created by NTLDR in step 50 to replace the intermediate system drive identification information with the NUSD identification information. The OS kernel then uses the in-memory structure (created by NTLDR in step 50 and modified by BOOTSWAP.SYS in step 58) to locate the system drives—including the NUSD—which will now be accessed using one or more of the loadable boot device drivers (step 60). The OS completes any remaining operations need to bring the system into a useable state (step 62), with the NUSD being used as the system drive. While BOOTSWAP.SYS is described herein as a separately loaded device driver, the present invention is not limited to this implementation. The OS kernel itself, for example, could incorporate the bootswap functionality, and modify the in-memory data structure created by NTLDR (step 50) to include identification information regarding the NUSD, as read from the OS boot configuration files (step 54). Alternatively, the bootswap functionality may be coupled with another device driver, or other module loaded during the boot process.

Figure 3:
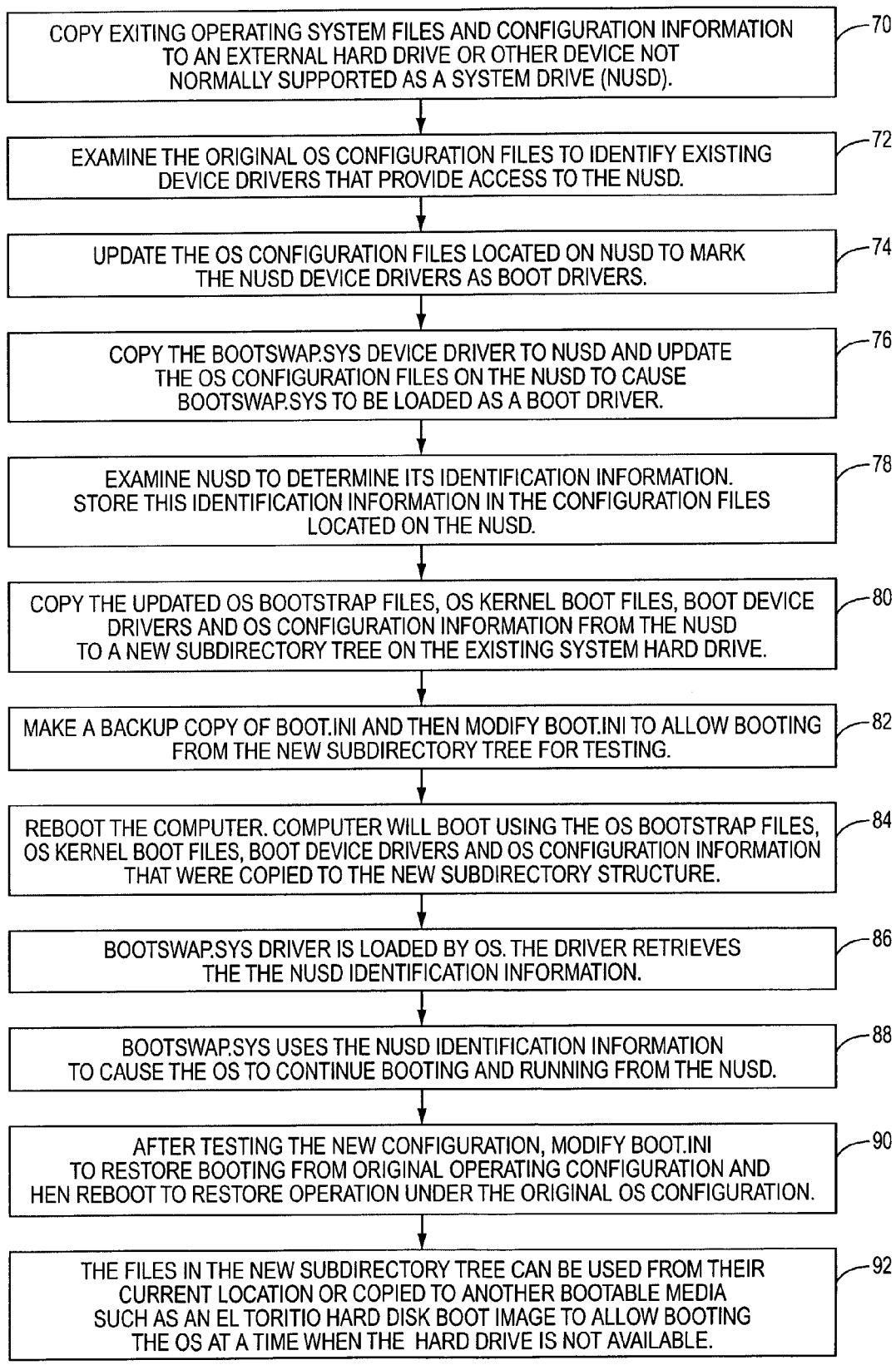
FIG. 3 is a flow diagram depicting a method for preparing a boot medium and configuring a normally unsupported system device to boot and run an operating system according to the present invention.

FIG. 3 is a flow chart depicting, for an exemplary embodiment of the present invention, the steps for using the existing files on a modern computer system, along with an additional boot driver, to create and test a new OS configuration that allows the computer to boot to run from a NUSD. First a copy is made of the original operating system executable and configuration files by duplicating each of the original operating system files from the computer hard drive onto the NUSD (step 70). Allowing the NUSD to be used a system drive requires that all of the device drivers used to access the NUSD be marked as boot drivers, thus ensuring the drivers are loaded at the proper time during the boot process. The original OS configuration files are examined to determine which drivers are needed to access the NUSD (step 72), and those device drivers identified are marked as boot drivers by updating the OS configuration files that were copied to the NUSD (step 74).

A bootswap device driver, named for example BOOTSWAP.SYS, is copied onto the NUSD and the configuration files on the NUSD are updated to cause BOOTSWAP.SYS to be loaded as a boot driver (step 76). The bootswap device driver is operative to alter an in-memory data structure maintained by the OS that identifies system drives, to list the NUSD as a system device. The NUSD is examined to generate disk identification information that the OS normally uses when determining the boot and system drives after it has loaded the final drivers and no longer accesses the boot and system drivers by the bootstrap disk drivers. The disk identification information for the NUSD is stored in the OS configuration files located on the NUSD (step 78).

The OS bootstrap files, OS kernel boot files, boot drivers and updated OS configuration information are copied from the NUSD to a new subdirectory hierarchy on the computer system hard drive (step 80). The file set copied from the NUSD to the hard drive contains only those files that are accessed by the bootstrap disk drivers before the normal device drivers have been initialized. This file set contains only a small subset of the total OS files copied to the NUSD in step 70.

To facilitate testing of the ability to boot from the updated drivers, a backup copy of the original OS boot configuration file BOOT.INI is created and the original BOOT.INI file is modified to allow test booting from the new subdirectory hierarchy (step 82). The computer is rebooted using the modified BOOT.INI file and the OS bootstraps using the files from new subdirectory hierarchy (step 84). The changes made to the duplicate OS configuration in step 76 cause the bootswap device driver BOOTSWAP.SYS to be loaded and initialized (step 86). When BOOTSWAP.SYS is initialized, it retrieves the NUSD device identification information that was saved in step 78, and uses this information to update the in-memory data structure used by the OS to determine the system devices after all boot device drivers are loaded and initialized. Booting continues, with the NUSD being recognized as the system device (step 88). The functionality of the OS running from the NUSD can be tested after it has finished booting, and then the original BOOT.INI can be restored and the computer rebooted from the original OS configuration (step 90). As those of skill in the art will readily recognize, the testing described in steps 82–90 represent sound programming practice, but are not essential to the operation of the present invention; the boot media and configured NUSD described herein may be prepared as described, without testing for proper operation, without departing from the scope of the present invention.

The files in the new subdirectory hierarchy can be used from where they are located, or copied to another bootable medium such as a hard disk boot image on an El Torito CD-ROM (step 92). In the latter case, the CD-ROM may be stored for use in the event of a hard disk crash, virus infection, or other system anomaly that renders the computer system drive unusable.

The present invention does not require the presence and installation of real-mode device drivers specifically compatible with the OS version, as is the case for legacy OS based disaster recovery systems. Rather, the present invention presents a generic solution to booting to allow running from a NUSD that does not require hardware specific device drivers, and will function even if the end user adds new hardware to his or her computer for which no real-mode drivers exist. This independence from real-mode device drivers may avoid the introduction of instability into a well-tested pre-existing computer and OS configuration. For example, prior art methods may require a real-mode device driver be loaded during the real-mode bootstrap phase to gain access to the NUSD. If this differs from the sequence of loading performed by the OS during a normal boot from the system drive, loading the real-mode device driver may cause IRQ, DMA, or I/O address conflicts between the real-mode device driver and the pre-existing protected mode device driver configuration.

Since the present invention does not rely on swapping drive designators, such as by altering real-mode kernel configuration files such as CONFIG.SYS and AUTOEXEC.BAT, the present invention is fully operable with any version of an OS, and may, for example, be employed with legacy OS's such as Windows 3x/9x/ME, as well as modern OS's such as Windows NT/2K/XP.

According to the present invention, following booting, the OS may continue to run from the NUSD as a system drive. This is important, as it provides for not only a disaster recovery solution to boot the computer and run diagnostic or anti-virus applications, but allows the computer to run from the NUSD indefinitely—such as, for example, when a user must wait for a new internal hard drive to be delivered and installed in the event of a severe disk crash. In addition, to the extent the internal hard drive is functional, all user data on the hard drive may be accessed, unlike many legacy-based systems that cannot access the advanced file system features that may be present in more modern file systems (e.g., NTFS). Since the OS according to the present invention is a back-up copy of the primary system OS, it naturally includes all functionality and may access all modes of the primary OS.

Since the present invention does not rely on a legacy OS, the OS files on the boot medium and on the NUSD may be legal back-up copies of the computer's primary OS. This eliminates a significant expense to the end user for disaster recovery software that accompanies the NUSD (either directly, or though licensing fees assessed on the disaster recovery software developer). The expense of disaster recovery software is additionally reduced by obviating the need for the duplicate development effort necessary to support a modern OS during normal use and a legacy OS during disaster recovery operations.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of booting a computer operating system to run from a disk drive device that is not normally supported as a boot or system device by the computer ROMBIOS, comprising:
   loading and initializing an operating system kernel from a natively supported boot device;
   after loading said operating system kernel, loading and initializing a device driver for a normally unsupported system device (NUSD);
   after loading said operating system kernel, loading and initializing a bootswap device driver operative to alter at least one operating system data structure other than changing a drive designator such that said NUSD is recognized by the operating system as a system device; and
   running said operating system from said NUSD.

2. The method of claim 1 wherein said operating system data structure is built by said operating system kernel in system memory.

3. The method of claim 2 further comprising loading disk identification information for said NUSD.

4. The method of claim 3 wherein said bootswap device driver alters said in-memory data structure to include said disk identification information.

5. The method of claim 1 wherein said NUSD includes operating system executable and configuration files.

6. The method of claim 5, wherein operating system files on said natively supported boot device and said NUSD are backup copies of a primary operating system that do not require a license separate from that for said primary operating system.

7. A method of computer disaster recovery, comprising:
   prior to loss of use of a computer system drive,
      copying original operating system executable and configuration files to a normally unsupported system device (NUSD); and
      creating a bootable medium for a device natively supported as a boot device, said medium including a bootswap device driver operative to update an operating system in-memory data structure, other than changing a drive designator, to recognize said NUSD as a system device; and
   following loss of use of said system drive,
      loading and initializing an operating system kernel from said medium; and
      after loading said operating system kernel, upon loading and initializing said bootswap device driver, completing the boot sequence and running said operating system from said NUSD.

8. The method of claim 7 further comprising updating said operating system executable and configuration files on said NUSD to mark as boot drivers those device drivers necessary to access said NUSD.

9. The method of claim 7 further comprising updating said operating system configuration files on said NUSD to include disk identification information for said NUSD.

10. The method of claim 7 wherein said bootswap device driver on said bootable medium is a boot driver.

11. The method of claim 7 wherein said bootable medium is a CD-ROM disk.

12. The method of claim 11 wherein said CD-ROM conforms to the El Torito specification.

13. The method of claim 7 wherein creating a bootable medium comprises:
  copying a plurality of files minimally necessary to initiate a boot sequence to a subdirectory hierarchy of a system drive; and
  copying said files from said subdirectory hierarchy to said bootable medium.

14. The method of claim 13 wherein said plurality of files are selected from the group including operating system bootstrap files, operating system kernel boot files, boot drivers, a bootswap device driver, test scripts and configuration information.

15. The method of claim 13 further comprising testing said plurality of files prior to copying said files to said bootable medium.

16. The method of claim 15 wherein said testing comprises:
  rebooting the computer from said plurality of files; and
  executing at least one test script prior to copying said files to said bootable medium.

17. A method of computer disaster recovery, comprising:
  prior to loss of use of a computer system drive,
    copying operating system executable and configuration files to a normally unsupported system device (NUSD);
    storing disk identification information for said NUSD in said operating system configuration files on said NUSD;
    copying to said NUSD a bootswap device driver operative to retrieve said disk identification information and update an operating system in-memory data structure, other than changing a drive designator, to recognize said NUSD as a system device;
    altering said operating system files to mark device drivers for said NUSD and said bootswap device driver as boot drivers; and
    copying a subset of operating system executable and configuration files from said NUSD to a disk natively supported by said computer as a boot device; and
  following loss of use of said system drive,
    loading and initializing an operating system kernel from said disk natively supported by said computer as a boot device;
    after loading said operating system kernel, loading and initializing said bootswap device driver; and
    running said computer from said NUSD.

18. A bootable computer readable medium including operating system files operative to cause a computer to perform the following steps during booting:
  loading and initializing an operating system kernel;
  after loading said operating system kernel, loading and initializing device drivers for a normally unsupported system device (NUSD);
  after loading said operating system kernel, loading and initializing a bootswap device driver operative to alter at least one operating system data structure, other than changing a drive designator, such that said NUSD is recognized by said operating system as a system device; and
  running said operating system from said NUSD.

19. The protected medium of claim 18 wherein said operating system files are a backup copy of the primary operating system of said computer.

20. The protected medium of claim 19 wherein said backup operating system files have been altered to load device drivers for said NUSD and said bootswap device driver during a boot sequence.

21. A method of booting a computer operating system to run from a disk drive device that is not natively supported as a boot device by a computer, comprising:
  loading and initializing a device driver for a normally unsupported system device (NUSD) from a natively supported boot device;
  loading configuration information from a natively supported boot device;
  loading and initializing a protected-mode operating system kernel from a natively supported boot device, said kernel operative to alter an in-memory data structure based on said configuration information, such that said NUSD is recognized by said operating system as a system device; and
  using said device driver to run said operating system from said NUSD.

22. The method of claim 21 wherein said configuration information includes identification information for said NUSD.

23. The method of claim 21 wherein said protected-mode device driver, said configuration information, and said protected-mode operating system kernel are loaded from the same natively supported boot device.

* * * * *